United States Patent [19]
Janky et al.

[11] Patent Number: 5,777,580
[45] Date of Patent: Jul. 7, 1998

[54] VEHICLE LOCATION SYSTEM

[75] Inventors: James M. Janky, Los Altos; David G. Bird, Sunnyvale, both of Calif.

[73] Assignee: Trimble Navigation Limited, Sunnyvale, Calif.

[21] Appl. No.: 396,977

[22] Filed: Mar. 1, 1995

Related U.S. Application Data

[63] Continuation-in-part of Ser. No. 978,272, Nov. 18, 1992, Pat. No. 5,418,537.

[51] Int. Cl.$^6$ .................................................. G01S 3/02
[52] U.S. Cl. ............................................................. 342/457
[58] Field of Search ....................................... 342/357, 457

[56] References Cited

U.S. PATENT DOCUMENTS

| | | | |
|---|---|---|---|
| 4,908,629 | 3/1990 | Apsell et al. | 342/457 |
| 5,021,794 | 6/1991 | Lawrence | 342/457 |
| 5,055,851 | 10/1991 | Sheffer | 342/457 |
| 5,208,756 | 5/1993 | Song | 364/449 |
| 5,223,844 | 6/1993 | Mansell et al. | 342/357 |
| 5,365,516 | 11/1994 | Jandrell | 342/457 |
| 5,544,225 | 8/1996 | Kennedy, III et al. | 379/59 |

*Primary Examiner*—Theodore M. Blum
*Attorney, Agent, or Firm*—Donald S. Dowden; Cooper & Dunham LLP

[57] ABSTRACT

Method and apparatus for determining vehicle present location using a location determination system (LDS), such as GPS, GLONASS, Loran or an inertial navigation system, that receives LDS signals from two or more sources. An LDS signal antenna and receiver/processor, an interrogation signal (IS) receiver means and IS responder means are electrically connected and carried on the vehicle. When a vehicle trigger event occurs, a specified vehicle IS is broadcast and is received by the IS receiver means. The IS receiver means causes the LDS receiver/processor to obtain vehicle present location information and to provide such information for the IS responder means, for transmission to an IS contact receiver (selected based upon vehicle present location). The IS receiver means and IS responder means are independently selected to be a cellular phone receiver, a paging signal receiver, a WAN/LAN workstation, or an Earth-satellite-Earth radiowave link, such as ORBCOMM$^{SM}$. Optionally, the LDS receiver/processor is kept in a "sleeper" mode, to conserve power until the IS receiver receives and responds to the specified IS, or is periodically activated to update the LDS antenna present location. Presence of the LDS equipment, IS receiver means and/or IS responder means are concealed on the vehicle. In another embodiment, a trigger event sensor is positioned on the vehicle and the responder means is caused to transmit to the vehicle present location information when a vehicle trigger event occurs, such as unauthorized movement of or entry into the vehicle, or collision of the vehicle.

8 Claims, 4 Drawing Sheets

VEHICLE LOCATION SYSTEM

Field of the Invention

This patent application is a continuation in part of an earlier-filed patent application entitled "Location Of Missing Vehicles". U.S. Ser. No. 07/978,272, filed Nov. 18, 1992, now issued as U.S. Pat. No. 5,415,537 and is assigned to the Assignee of the earlier filed application. This invention relates to use of a location determination system for location of a vehicle for which a trigger event has occurred and to communication on demand present location information for that vehicle.

BACKGROUND OF THE INVENTION

Movable vehicles, such as automobiles, trucks, buses, boats, airplanes, motorcycles and motorized bicycles, are occasionally misplaced, lost or stolen, sometimes permanently. Between one and two percent of the automobiles three years old or less are stolen or taken, and the percentage of recovery of such vehicles is about 63 percent. Several workers have developed methods that might be used to recover a missing vehicle, by continuous tracking of the vehicle.

A personnel locator system using a pager system is discussed in U.S. Pat. No. 3,439,320, issued to Ward. Each person carries a sensor and/or transmitter that emits a unique frequency whenever that person enters any one of a plurality of selected areas in a facility, with each such area having a receiver that receives this signal and transmits this information to a central processor. The processor keeps track of the movements of each person from one selected area to another area so that, at any given time, the processor can identify the selected area a given person now occupies. This approach is limited to a relatively small geographic area and to a relatively small number of covered persons.

In U.S. Pat. No. 3,599,200, Bunting discusses use of paging signals to provide a doctors' register, to determine which medical doctors are present at a facility such as a hospital. The page signal can be altered to provide a limited amount of other information.

Zahnd, in U.S. Pat. No. 4,110,743, discloses a wireless paging receiver that receives and responds to a paging signal directed to an individual receiver or to a selected group of receivers. The paging signal contains one or more code words that specify the paging receiver or group of receivers being addressed. This idea is assertedly extended to a nationwide paging system, with provisions for location of an area in which the targeted receiver is now located, in U.S. Pat. No. 4,178,476, issued to Frost, and in U.S. Pat. No. 4,891,638, issued to Davis. Provision for reply to receipt of a paging signal by the paged party, using a telephone to reach a phone number specified in the paging signal, is disclosed by Levine in U.S. Pat. No. 4,263,480. A paging signal receiver with a video display for one of a limited number of pre-stored messages for the paged party is disclosed disclosed by Levine in U.S. Pat. No. 4,336,524.

Tsunoda, in U.S. Pat. No. 4,660,032, discloses a radio paging receiver with a memory and video display to receive a short alphanumeric message. A page message, subsequently called up from memory for viewing by the paged party, is scrolled one line. A digitally encoded paging signal, stored in the paging receiver memory and subsequently retrieved and audibly displayed using a speech synthesizer, is disclosed in U.S. Pat. No. 4,769,642, issued to Davis et al.

Serrano et al disclose a microprocessor-controlled interface for a cellular phone system to be carried in a vehicle, in U.S. Pat. No. 4,718,080. A telephone handset communicates with the cellular transceiver along a bus and through the microprocessor that interprets bus logic signals, including voice and data signals. No integration is disclosed of the on-board cellular system with any instrument that reports vehicle operating information upon command received from a remote site.

In U.S. Pat. No. 4,775,999, Williams discloses automatic registration of a cellular telephone or paging receiver whenever the telephone/receiver enters a new paging area, in order to quickly provide inter-area message handoffs for a mobile recipient. A similar approach, applied to a selected subset of all mobile receivers, is disclosed by Comroe et al in U.S. Pat. No. 5,054,110.

Providing a domestic appliance, such as a clothes dryer, with an event sensor (completion of the appliance's assigned task) is disclosed in U.S. Pat. No. 4,797,656, issued to Keppler. When the sensor senses occurrence of the target event, the operator of the appliance is notified by transmission of a paging signal. Similar apparatus, using a telemetry unit to advise a remotely located operator of changes in one or more operating parameters for a machine, is disclosed by Saunders in U.S. Pat. No. 4,856,047. Use of similar paging apparatus, attached to the birth canal of a pregnant livestock or zoological animal, is used to announce birth of an animal in U.S. Pat. No. 4,994,665, issued to Wernsing.

U.S. Pat. No. 4,797,671, issued to Toal et al, discloses a motor vehicle locator system that indicates the location of a parked vehicle within a controlled area, such as a large parking lot. Each parked vehicle carries a receiver and audio/visual signal emitter. The receiver responds only to receipt of a signal having a unique frequency and causes the emitter to emit an audible or visually perceptible signal that indicates the present location of the parked vehicle. This approach requires that the vehicle be located within a controlled area of modest size, probably no larger than a city block.

Ando et al., in U.S. Pat. No. 4,837,700, disclose method and apparatus for processing and displaying the present location of a road vehicle, using a GPS receiver to provide data on vehicle location. This approach provides continuous information on vehicle location and vehicle orientation or movement vector based upon sensing the Earth's local geomagnetic field direction. An angular rate sensor determines, and optionally displays, the angular rate of change of vehicle orientation, and an odometer determines the distance the vehicle has moved over some predetermined time interval. The present vehicle location can be displayed graphically on an electronic map carried within the vehicle, with a sequence of maps being used to display the changing vehicle location. Map size can also be increased or decreased, and the displayed map can be automatically scrolled as vehicle position changes. A keyboard is available for entering instructions into a controller or processor. A reference location can be entered into the system, and vehicle location can be determined relative to this reference location. The location data can be stored if these data are acceptable and can be dumped into a bit bucket if these data are not acceptable.

In U.S. Pat. No. 4,924,402, Ando et al disclose a more detailed approach for determining and graphically displaying vehicle location using a GPS. This system uses a magnetic field sensor, an angular velocity sensor and a travel distance sensor together with GPS data and stores maps together with numerical data that describe useful features of the local terrain. Sensing of vehicle distance traveled and directional turns made is intended to be sufficiently accurate that the map displays the location of the vehicle relative to road intersections (i.e., approaching, passing through, turning, etc.). With reference to FIGS. 16–17, 22, 27–28 and 30, the invention appears to put a premium on receiving GPS data that are accurate to within one meter.

Gutman et al. in U.S. Pat. No. 4,940,963, disclose a paging system with acknowledge-back signal capabilities. When a paging signal is broadcast, if the broadcaster does not receive an acknowledgment signal within a selected time interval, the system concludes that the paging signal was not received by the addressed paging receiver. Use of a paging signal transceiver only for transmitting an acknowledgment signal to a plurality of nearby receivers is disclosed in U.S. Pat. No. 4,968,966, issued to Jasinski et al; these nearby receivers define a polygon that provides a rough estimate of the location of the transceiver at the time the acknowledgment signal was transmitted.

A paging system with paging signal receivers that respond or are controlled differently, depending upon receiver location, is disclosed by Vrijkorte in U.S. Pat. No. 4,943,803. Using "angle modulation" whose operation is not explained, the paging request receiver is said to pick out the strongest transmission control signal from among simultaneously transmitted control signals and to respond to this signal, if the signal received includes the receiver's predetermined address code. The receiver goes into a "sleeper" mode if no signals specifically addressed to that receiver are received within a selected time interval. The receiver is activated for receiving a control message by receipt of a receiver activation signal that may vary with the geographic zone presently occupied by the receiver.

Bezin et al disclose a system for managing already-paid vehicle parking fares by means of information cards affixed to the vehicles, in U.S. Pat. No. 4,982,070. The card contains a confidential identification number for the vehicle and the prepaid vehicle parking and includes an adhesive label that allows the card to be affixed to a vehicle windshield or another visible area. A portable card checking machine, carried by a roving parking lot operator, allows readout of this information from the card.

A satellite signal tracking method for signal reacquisition in the presence of a "dead zone", such as a tunnel or very tall adjacent building that interrupts receipt of all GPS signals, is disclosed by Ando in U.S. Pat. No. 4,983,980. The tracking system determines the satellite that had the maximum elevation angle at the moment the GPS signals are interrupted and seeks and re-tracks that satellite as soon as the receiver clears the dead zone. The signal from the satellite with the next highest elevation angle is then reacquired and re-tracked, and so on. This allegedly minimizes the time for signal reacquisition. Little quantitative information is disclosed in this patent.

A paging signal receiver with over-the-air characterization of the incoming paging signal is disclosed in U.S. Pat. No. 5,025,252, issued to DeLuca et al. The incoming paging signal includes a coded message that characterizes the type of signal and determines the subsequent processing route for the received paging signal.

Scribner et al disclose a vehicle tracking system that records, but does not transmit, the location of a vehicle whenever one or more predetermined events occurs in U.S. Pat. No. 5,014,206. The vehicle carries sensors that respond to occurrence of a predetermined event and carries a GPS or Loran navigational system that receives vehicle location information, such as longitude and latitude. This vehicle location information is stored in a memory on board the vehicle only when one or more of the predetermined events occurs. The vehicle location information is assumed to be read out periodically when the vehicle returns to a home base.

In U.S. Pat. No. 5,043,736, Darnell et al disclose use of a combined cellular telephone and GPS portable receiver system that provides latitude and longitude coordinate information for the receiver. The GPS receiver has a modem and transmitter connected thereto that transmit its position to an accessible cellular phone, which in turn notifies a stationary base unit of the location of the GPS receiver. The base unit graphically displays the present location of the GPS receiver. This patent does not disclose communication with the receiver by a paging system located elsewhere, to activate the transmitter and modem, nor activation of a GPS receiver in a vehicle that is later determined to be missing.

Wesby, in U.S. Pat. No. 5,051,741, discloses a location determination system for a mobile unit, such as a vehicle. When the mobile unit is to be located in a given region, a paging signal, containing a coded signal identifying the targeted mobile unit, is broadcast in the given region. Upon receipt of this paging signal, the targeted mobile unit responds by transmission of a response signal that is received by a plurality of local communication station that are near the mobile unit. A master station subsequently interrogates these communication stations to determine the location of a polygonal sector, defined by three or more adjacent communication stations that received the response signal from the mobile unit. More precise information on the present location of the targeted mobile unit is not provided.

On-board navigation apparatus, to be carried on a vehicle to compare present and immediate-past locations on any of a specified network of roads, as determined from GPS data, is disclosed by Odagawa et al in U.S. Pat. No. 5,087,919. This system would not work well for a vehicle, such as an off-road land vehicle or a marine vessel, that has no fixed system of roads or paths to follow.

Lojack Corp. of Dedham, Mass. has demonstrated a vehicle location system using triangulation of radio signals transmitted from the vehicle by a large number of receivers that are strategically positioned around a community. The vehicle transmitter is remotely activated by a signal broadcast from elsewhere.

These patents disclose use of LDS or related technology for determination of location or orientation of a person or vehicle continuously or at discrete times, without regard to the associated consumption of power, cost of equipping or tracking the vehicle, or cost of communicating the vehicle location. What is needed is a system that allows determination of location of a vehicle (only) when a trigger event occurs, such as misplacement, theft or unauthorized movement of the vehicle, break-into the vehicle, or collision of another object with the vehicle, so that system power usage is controllable and is minimized, and communication from and tracking of the vehicle are minimized. The system should allow communication at will between the LDS receiver and an inquirer located elsewhere and should provide reliable communication between the inquirer and the vehicle wherever the vehicle is located.

SUMMARY OF THE INVENTION

These needs are met by the invention, which provides method and apparatus for determination of present location of a vehicle, usually when a trigger event occurs, such as determination that the vehicle is missing or that the vehicle is being moved without authorization, that the vehicle is being broken into, or that another object has collided with the vehicle (usually, when the target vehicle is "parked" or stationary). The vehicle carries a location determination system (LDS) signal antenna and an LDS signal receiver/processor that is connected to the antenna, for receiving LDS signals and for determining the present location of the antenna from these signals.

When the trigger event occurs, the vehicle owner or operator contacts a vehicle location service center or other suitable communications facility, which broadcasts a specified interrogation signal IS (by a cellular phone, pager transmitter, WAN/LAN station or Earth-satellite-Earth radio link), requesting information on the present location of the vehicle; this interrogation signal is selectively received by the vehicle. An IS communications receiver on the vehicle receives and responds to receipt of this IS by interrogating the on-board LDS signal receiver/processor as to the vehicle present location. The LDS receiver/processor provides vehicle present location information for an IS responder/transmitter means, such as a cellular phone, pager transmitter, WAN/LAN station or Earth-satellite-Earth radio link), also located on the vehicle. The IS responder/transmitter transmits this present location information to a selected IS contact number.

The vehicle present location can be determined entirely by the on-board LDS signal receiver/processor, or information sufficient to determine the vehicle present location can be transmitted to a processor at the selected IS contact receiver for final processing and presentation. A battery back-up is optionally provided to provide power for the IS communications receiver and antenna, LDS signal receiver/processor and antenna and/or IS responder/transmitter and antenna on the vehicle. Alternatively, the vehicle itself may have one or more sensors attached that sense when a trigger event occurs and that issue an appropriate location interrogation signal that is responded to by an on-board LDS signal receiver/processor, LDS signal antenna and IS responder.

A controller and modem are optionally installed in the vehicle and electrically connected to one or more of the IS communications receiver, the the LDS signal receiver/processor and the IS responder/transmitter. Receipt of an IS by the IS communications receiver causes the controller to interrogate the LDS receiver/processor to obtain present location information for the vehicle. The LDS receiver/processor receives LDS signals from one or more LDS signal sources and communicates the present vehicle location information directly to the IS responder or to the controller for formatting and/or presentation to the IS responder/transmitter. The IS responder/transmitter contacts the selected IS contact receiver and transmits the present vehicle location information, for subsequent analysis, recovery of the vehicle and/or related purposes. The IS may be coded to solicit one or more of several predetermined responses by the vehicle communications apparatus, such as contacting different IS contact numbers, depending upon the vehicle present location. The LDS antenna (if present) and LDS receiver/processor receive LDS signals from satellite-based LDS signal sources or ground-based LDS signal sources, or from a group of gyroscopes, local magnetic field sensors or other inertial sensors mounted on the vehicle.

The method and apparatus of the invention provide a vehicle locator system that allows a vehicle to be located anywhere on the Earth's surface that can be reached by an interrogation signal and LDS signals. The portion of the apparatus contained in the vehicle is preferably hidden and not in plain view of any person within or adjacent to the vehicle. Communications between the vehicle location service center and the vehicle do not call attention to themselves so that no one in or adjacent to the vehicle is aware that such communications are being received and transmitted.

Because vehicle location is only reported after occurrence of a trigger event, such as determination that the vehicle is missing or that a collision or break-in has occurred, the vehicle location service center tracks only a relatively small number of vehicles at one time, namely vehicles for which a trigger event has occurred.

DETAILED DESCRIPTION OF THE INVENTION

Figure 1:
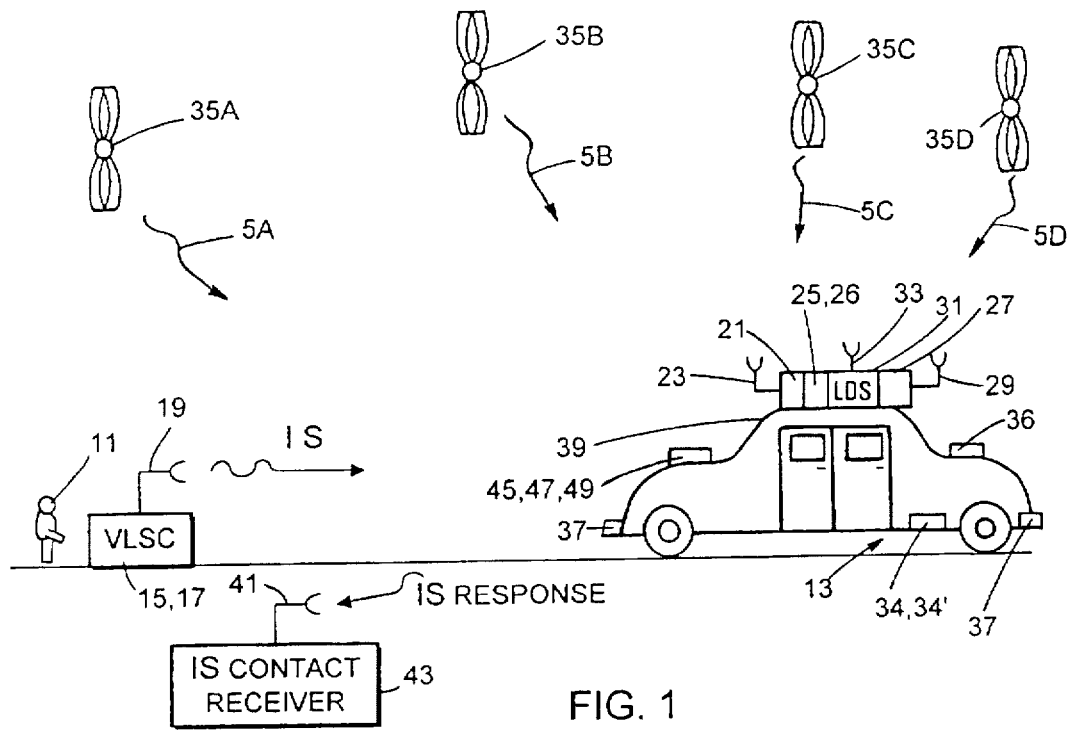
FIG. 1 and 2 are schematic views of apparatus for practice of the invention.

FIG. 1 illustrates apparatus used to locate a vehicle, for which a trigger event has occurred, according to the invention. For example, a vehicle owner or operator 11 might realize that his/her vehicle 13 is missing or has been moved without authorization and initiates a search for the vehicle, using the invention, by notifying a vehicle location service center (VLSC) 15. An interrogation signal (IS) transmitter 17 and associated IS antenna 19 controlled by the VLSC 15 send a vehicle interrogation signal IS to communications apparatus on the target vehicle 13, requesting determination and transmission of vehicle present location information to a selected IS contact facility. A selective IS is broadcast on a forward communications path, specifying the trigger event vehicle 13 by means of a unique identifying code or address or by other appropriate vehicle identification means. The vehicle 13 carries an IS communications receiver 21 and associated IS receiver antenna 23, an optional controller and interface 25 and modem 26, an IS communications transmitter or responder means 27 and associated IS responder antenna 29 (which may coincide with the IS receiver antenna 23), and an LDS signal receiver/processor 31 that can electronically communicate with each other. Preferably, at least one of these devices is concealed on or within the vehicle 13.

The LDS signal receiver/processor 31 has one or more LDS signal antennas 33 (also hidden) to receive LDS position signals Sj (j=A, B, C, D) at the LDS frequency or frequencies used by one or more LDS signal sources 35A, 35B, 35C and 35D that transmit these LDS signals. This LDS antenna 31 can be mounted on or within one or more bumpers 37 or other projections of the vehicle 13, on a rear or side window of the vehicle, within a roof or top panel 39 of the vehicle 13, or elsewhere. Preferably, the antennas 23, 29 and/or 33 are mounted on the vehicle so that the presence of these antennas is hard to detect. The IS responder or transmitter means 27 and associated antenna 29 transmit vehicle present location information on a return communications path to a selected IS contact antenna 41 and associated IS contact receiver 43 that are located elsewhere, at a selected IS contact number.

The IS communications receiver 21 can be chosen to be a cellular telephone, a page signal receiver, a WAN/LAN station or an Earth-satellite- Earth radio link receiver, as discussed below. Independent of the choice of IS communications receiver 21, the IS communications transmitter or responder means 27 can be chosen to be a cellular telephone, a page signal receiver, a WAN/LAN station or an Earth-satellite-Earth radio link receiver, as discussed below.

A cellular telephone signal, as used herein, is a coded radiowave signal or other electronic communication, broadcast in a selected frequency band by a cellular transmitter, that is intended for and is received and responded to by a particular cellular handset that may be carried from place to place, within the range of the transmitted cellular signal. A cellular telephone system allows two-way voice and/or data communications and is discussed in detail by D. M. Balston and R. C. V. Macario, *Cellular Radio Systems*, Artech House, Boston, 1993, pp. 1–72, and by S. J. Bigelow, *Understanding Telephone Electronics*, SAMS Publishing, Indianapolis, Third Edition, 1993, pp. 323–341, both incorporated by reference herein. A mobile cellular telephone system typically provides a plurality of contiguous cells, often shaped as regular hexagons with diameters that are 3–45 kilometers in diameter, depending upon the expected density of cellular phone users that may request cellular service at any given time. A cellular base station is located somewhere near the center of the cell serviced by the base station and has a transmitter that transmits cellular phone signals (voice, data, control) with electrical power as high as 200–500 Watts. Each cellular base station is connected to a Mobile Telephone Switching Office (MTSO), which switches telephone calls made by a mobile cellular phone or made to a mobile cellular phone from one cell (calling party) to an appropriate cell (called party). This connection between cellular base station and MTSO can be a hardwired telephone landline or can be a wireless connection. The cellular base station communicates with one or more mobile cellular telephones that are presently located within that base station's cell and that are "active", as a calling party or as a called party.

The mobile cellular telephone unit includes a transceiver that communicates with the cell's base station, also at high power (200–500Watts), a control unit and appropriate radio-wave antennas. The cellular base station and a mobile cellular station communicate with each other using a first carrier frequency for send and a second, different carrier for receive, with these two carrier frequencies being chosen in the ranges 826–845 MHz and 870–890 MHz and with the width of each send and receive channel being about 30 kHz. Typically, an idle channel signal, an acknowledgment signal channel, a seized channel signal, a channel connect signal and a channel disconnect signal have in-band frequencies of 2000 Hz, 2150 Hz, 1800 Hz, 1633 Hz and 1336 Hz, respectively. The cellular base station will select a single carrier and make that channel available, using the idle channel tone. When a calling party or called party within the cell requires service, that designated idle channel will be seized and used, and the cellular base station will provide another idle channel for the next user. The F.C.C. has allocated 666 carrier frequencies for use in cellular telephone calls, and each cell is typically assigned about 90 of these carrier frequencies for its use. The carrier frequencies are allocated to each cell so that two contiguous cells have no identical carrier frequencies. Signal interference is suppressed by use of steep fall-off frequency filters for each channel, at the base station and at each mobile cellular telephone unit. Because each cellular telephone call requires use of two carrier frequencies, each cell can service up to 45 two-way cellular telephone calls simultaneously. When a mobile cellular telephone that is "active" leaves a first cell and enters a second cell, the base stations for these two cells cooperate to provide "handoff" of responsibility for cellular telephone service from the first cell base station to the second cell base station.

A "page" signal, as used herein, is a coded radiowave signal or other electronic communication, broadcast in a selected frequency band, that is intended only for and is sensed and responded to only by a particular page signal receiver, referred to herein as a "page" or pager means. A person or electronic device that carries or is attached to the page or pager means then responds affirmatively by communicating with the page signal source, by a separate telephone call or by other communication, or by performing some other task, to acknowledge receipt of the page signal. Operation of an early page signal system is discussed by Ward in U.S. Pat. No. 3,439,320, incorporated herein by reference. The forward path communication and/or the return path communication in the invention may use a page signal.

One example of a pager system, offered by Reach Electronics, Lexington, Nebr., includes a Liaison™ paging terminal (located at the VLSC) and accommodates up to 2044 page subscribers. This terminal has 1–4 telephone input lines and 1–2 transmitter output lines and may include a priority input line for special purposes, such as reporting on occurrence of emergencies. Each paging transmitter line has an associated stack of paging signals that have not yet been broadcast, to provide queuing when paging requests are received faster than can be broadcast. A page signal broadcast by the transmitter is released and joins the queue on a stack when the target page subscriber's terminal (page) is otherwise engaged (busy or inoperable). A paging terminal can issue a selective target paging signal, intended for a single, specified page subscriber's terminal, and/or can issue a group paging signal to communicate with a specified group of subscriber terminals. A DTMF telephone or a data terminal can be used to (re)program the paging terminal, including acceptance of a substitute pager module (carried by a page subscriber) and imposition of pager verification. The paging terminal can communicate by tone-only signals (one or two tones), by numeric or alphanumeric signals, and by voice. A page subscriber's module can be programmed to transmit a preselected message when an emergency situation occurs.

The selected maximum time interval for a message to be transmitted by the paging terminal can be 0–255 seconds. Two available frequency ranges for use by a paging terminal and/or a page subscriber's response are: 30–54 MHz, with 25 kHz channel spacing, EIA selectivity of −55 dB at ±25 kHz, image rejection at −60 dB, and 5 μvolts/meter sensitivity; and 148–174 MHz, with 30 kHz channel spacing, EIA selectivity of −60 dB at ±30 kHz, image rejection at −60 dB, and 5 μvolt/meter sensitivity. In one offering by Reach, the page subscriber's paging signal module includes a dual conversion FM heterodyne receiver and a battery-saving circuit that allows an average of 4.5 to 9 months use without recharging, depending upon signaling format used and average daily use. Other radiowave frequencies and other companies paging terminals can also be used to transmit a paging signal.

The forward path IS and the IS response on a return path can also be sent through a wireless, hardwired or combined wireless/hardwired wide area network (WAN) or combined WAN/LAN that uses a local area network (LAN) for local, off-WAN communication with a target vehicle. One example of a WAN/LAN is the UtiliNet radiowave system offered by IMetricom, Los Gatos, Calif. The UtiliNet system uses a WAN, supplemented by a plurality of LANs that serve smaller sub-regions (3–15 kilometers in diameter) that collectively cover the larger region served by the WAN. One or more main servers act as a clearinghouse for interrogation signals and control, status and information signals transmitted on the WAN/LAN. A target vehicle presently located in a particular LAN subregion will be contacted by a VLSC using the WAN and this LAN, and will respond to the VLSC or to a specified surrogate in the same manner.

The UtiliNet system offers three radiowave systems for different communication purposes on the WAN/LAN. A Network radiowave unit, the simplest of the radiowave systems, routes network data packets (up to 1500 bytes per packet), draws its power from the line, and communicates with other LAN entry/exit points and other devices on the WAN. An RS232-based Wangate radiowave unit operates at an entry and/or exit point between the WAN and a subsidiary LAN, preferably providing an intelligent human interface through use of a PC that is part of the LAN. Optionally, the LAN can use a powerline carrier for communication with a mobile device, such as an IS communications receiver or IS responder carried on the target vehicle. The LAN PC can communicate with an LDS receiver/processor carried on the target vehicle. A Status/Control radiowave unit can be used to communicate with and interrogate all or selected devices and entry/exit points on the WAN concerning operating information, such as power usage, remaining battery life (if relevant), operation within a permitted parameter range, and other relevant information. The maximum rf data rate on a UtiliNet line is 77 kbits/sec, and an average data rate of 20–30 kbits/sec is available.

An entry/exit point for a LAN sub-region is served by a low power LAN radio ($\approx$100 milliwatts) that supports up to 240 separate channels, using frequency hopping or spread spectrum signal transmissions with frequency filtering for channel-to-channel isolation. This LAN radio has a coverage range of 3–7.5 km for general signal reception and up to 15 km for undisturbed line-of-sight visibility. A radio LAN is programmable, using an applications programming language, Device Control Word (DCW), and up to 5 programs with up to 207 bytes each can be run simultaneously. Input signals at a LAN radio can be sensed at low voltages (12–32 Volts dc and 10–32 Volts ac, 20 milliamps max current) and at high voltages (90–140 Volts dc or ac, 5 Amps max current), and can operate for up to 15 hours in a battery mode. The WAN/LAN UtiliNet system operates in an FCC-unlicensed frequency range, 902–928 MHz, using channel spacing of about 25 kHz. An rf portability modem allows transmission and receipt of WAN/LAN signals from a moving user, although the maximum user speed for this purpose is still modest (9 km/hour).

Metricom offers another WAN/wireless LAN communication service, Ricochet™, operating in the same 902–928 MHz carrier frequency range, with 100 kbits/sec maximum data rate and an average of about 35 kbits/sec throughput. The Ricochet™ system provides wireless access to a computer network or other wired network, to the public switched telephone network, and to the Internet.

Another WAN/LAN system that may be used here is the CellNet™, offered by Domestic Automation Company, San Carlos, Calif. The WAN-to-LAN connection is also handled by a low power radio or low power line carrier, using Neighborhood LANs connected to Remote Terminal Units that communicate with a System Control LAN, which in turn communicates with the WAN. A Neighborhood LAN supports data transmission of up to 19.2 kbits/sec at a range of up to 3.8 kilometers. A 25 kHz-width communications channel can be split into 2 sub-channels of width 12.5 kHz each. These 2 sub-channels can be further split into 4 sub-sub-channels, and 8 contiguous sub-sub-channels can support data transmission at up to 24 kbits/sec. Frequency re-use raises this data transmission rate, to as high as 72 kbits/sec. Each sub-sub-channel is masked by a high fall-off frequency filter from interference from nearby sub-sub-channels (–20 dB at a sub-sub-channel edge). The CellNet™ system uses interconnected networks, including a computer network for LAN communication, a cellular radio-wide network and a plurality of customer site LANs. The CellNet system was developed initially for remote reading of utility meters, and it is unclear whether a LAN entry/exit point device would support communication with a moving vehicle.

The forward path IS and/or the return path IS response can also be carried on an Earth-satellite-Earth radio link, such as the ORBCOMM$^{SM}$ satellite-assisted radio link. The ORBCOMM$^{SM}$ system provides 2 radiowave relay satellites in a circular polar orbit and 8 uniformly spaced radiowave relay satellites in each of 3 circular orbits inclined to the equator at 45 degrees, all at an altitude of 785 kilometers. The satellite relay half-beam width is 60 degrees, which provides an approximately circular signal footprint on the Earth's surface with a diameter of about 4600 km. Antenna gain away from the return beam center is increased to compensate for the longer distances reached by signals near the edge of the return beam. Eight additional radiowave relay satellites may be added in a fourth circular orbit across the equator. The satellites serve as radiowave relays between two ORBCOMM$^{SM}$ users. A first user communicates with a Network Control Center, which then forwards the first user's message through a Gateway Earth Station (GES), through the satellite network and through another GES, if appropriate, to a second user (the message recipient), using standard communications protocols (X.25, X.400, dial-up). At each Gateway Earth Station, two steerable VHF antennas track two ORBCOMM$^{SM}$ satellites across the sky. This allows first and second VHF antennas to track first and second satellites that are ascending and are descending, respectively, in the sky. Each ORBCOMM$^{SM}$ satellite determines its present location, with an associated inaccuracy of 100–1000 meters, by receiving and analyzing GPS signals from GPS satellites. The ORBCOMM system uses uplink carrier frequencies of 148.0–150.0 MHz and uses downlink carrier frequencies of 137.0–138.0 MHz and 400.05–400.15 MHz, with channel capacity of 57.6 kbits/sec for the GES-satellite links and of 2.4 or 4.8 kbits/sec for the satellite-user links.

ORBCOMM$^{SM}$ provides two services that could be used to help implement the invention. SecurNet$^{SM}$ broadcasts emergency alert signals after a button is pushed by a SecurNet$^{SM}$ user. These signals can be picked up by the user's hub station, which will forward the alert signal and will send an acknowledgment signals that terminates the otherwise-continuing broadcast of the alert signal. MapNet$^{SM}$ transmits the estimated location of a remote ORBCOMM$^{SM}$ unit and might be used for monitoring the location of movable objects, such as buoys and vehicles. SecurNet$^{SM}$ and MapNet$^{SM}$ each provide one-way communications.

The IS transmitter 16 associated with the VLSC 15 (FIG. 1) and the IS communications receiver 19 are part of a first IS communications system that can be based on a cellular telephone system, a paging system, a WAN/LAN system or an Earth-satellite-Earth radiowave link that uses one or more satellites to relay messages from a first location to a second location on or near the Earth's surface. The IS responder means 23 and the IS contact receiver 35 are part of a second IS communications system that can be based on a cellular telephone system, a paging system, a WAN/LAN system or another Earth-satellite-Earth radiowave link that uses one or more satellites to relay messages from a first location to a second location on or near the Earth's surface. The first and second IS communications systems are chosen independently so that 4×4=16 different choices of combined first and second IS communications apparatus are available: cellular, paging, WAN/LAN or Earth-satellite-Earth radiowave link for the first IS communications system with cellular, paging, WAN/LAN or Earth-satellite-Earth radiowave link for the IS response communications system.

The LDS may be a satellite-based, Satellite Positioning System (SATPS), such as GPS or GLONASS, or may be a ground-based LDS, such as Loran, Tacan, Decca, Omega, JTIDS Relnav, PLRS or VOR/DME, or may be a specialized LDS such as an FM subcarrier system. Alternatively, the LDS may rely upon signals produced by on-board gyroscopes or inertial sensors that sense velocity, acceleration, three-dimensional angles and/or local magnetic field strengths and directions to determine the present location and heading of the vehicle. Each of these LDSs is discussed below.

The LDS signal receiver/processor 31 receives LDS signals from an associated LDS signal antenna 33, or from one or more on-board location sensors 45, 47 and 49. These signals contain information allowing determination of the location of the LDS antenna 33 or of an on-board location sensor. Preferably, but not necessarily, the LDS signal receiver/processor 31 operates only in response to receipt of an interrogation signal from the controller 25, if desired, in order to reduce the electrical current draw from a power supply for the controller. In this embodiment, the LDS receiver/processor 31 is normally in a "sleeper" mode and is awakened only when a trigger event occurs. This approach conserves electrical power used to operate the LDS receiver/processor 31 and also makes detection of the presence of this apparatus more difficult.

Figure 2:
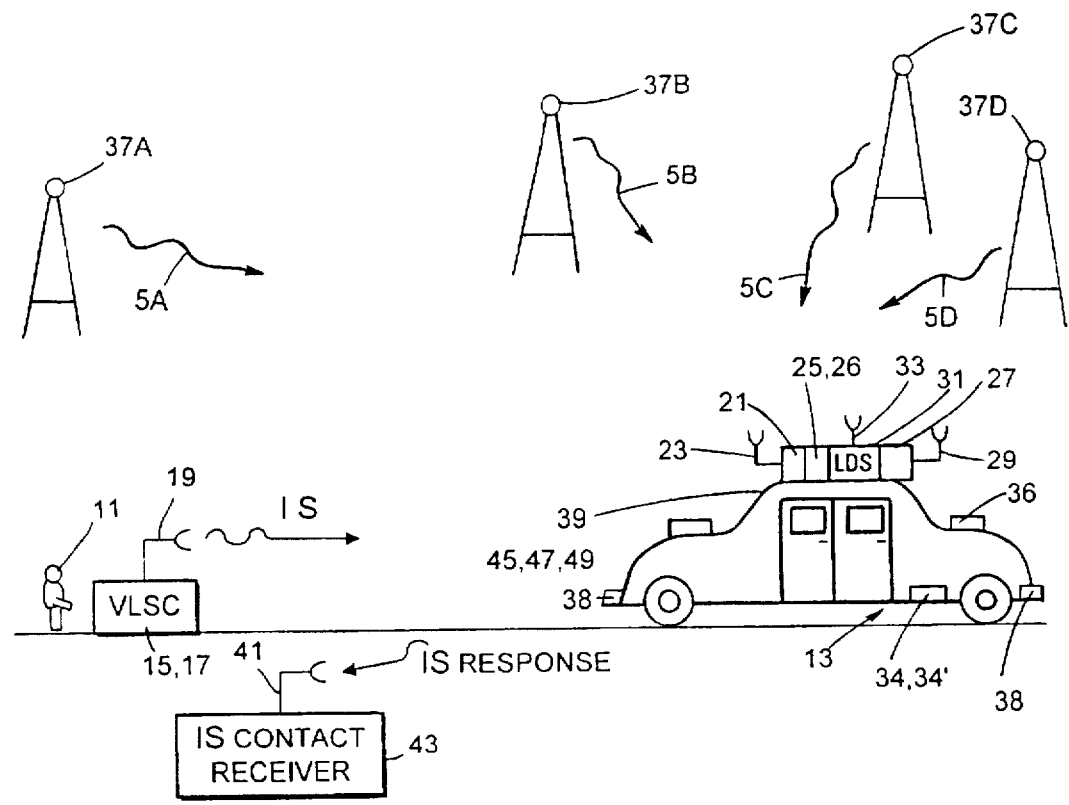

Alternatively, the LDS receiver/processor 31 may be awakened periodically (e.g., for 15-120 seconds every 1-15 minutes) to obtain a new fix from satellite-based LDS signal sources 35A, 35B, 35C, 35D that provide the best LDS signals in this locale, as indicated in FIG. 1. FIG. 2 illustrates an embodiment of the invention in which the LDS signal sources 37A, 37B, 37C, 37D are ground-based rather than satellite-based.

Figure 3:
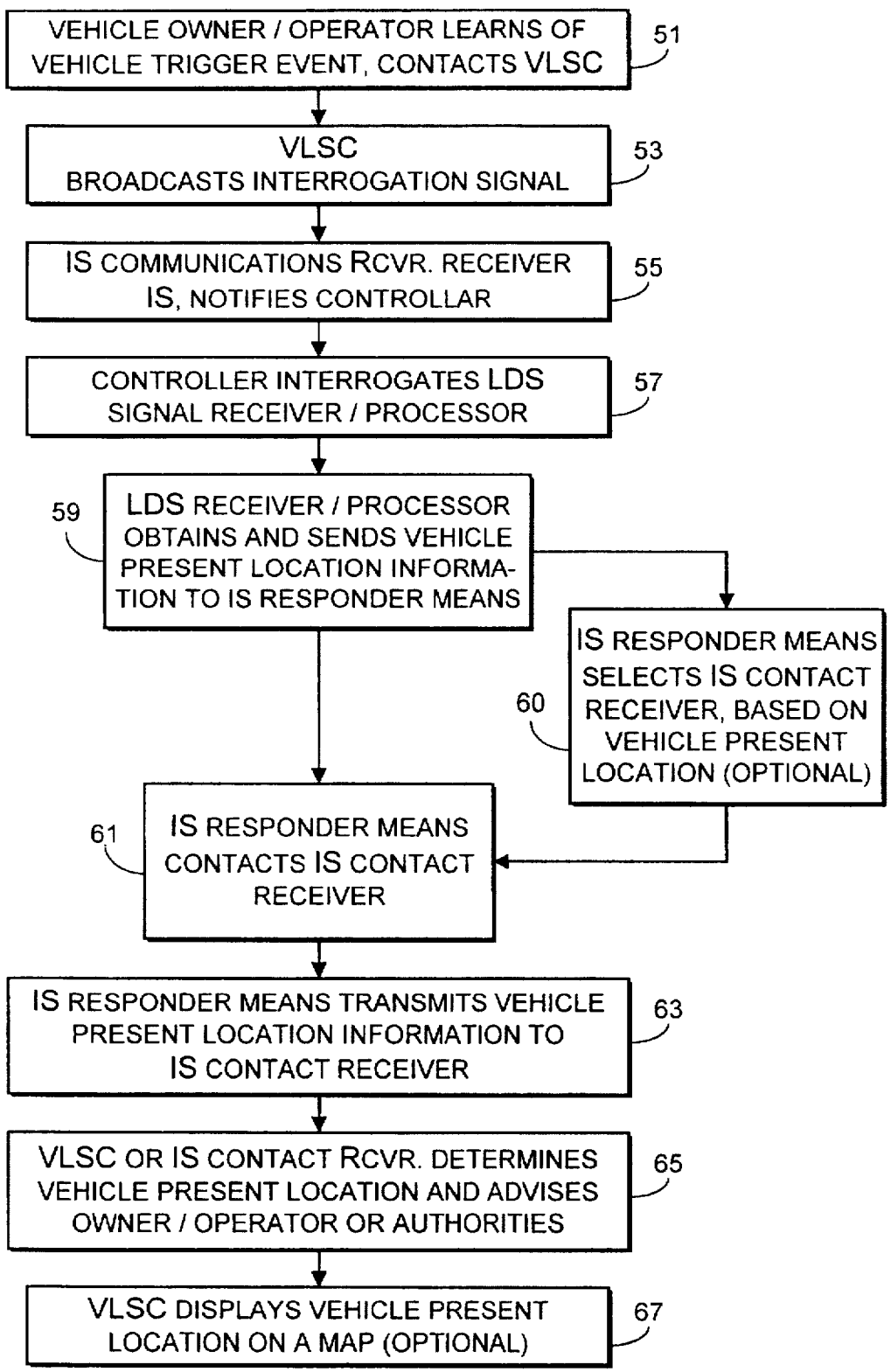
FIGS. 3 and 4 are flow charts for practice according to two embodiments of the invention.

FIG. 3 illustrates, in flow chart form, a procedure that can be followed, in the situations shown in FIGS. 1 and 2, to locate a trigger event vehicle 13. In step 51, a vehicle owner or operator notices that his/her vehicle 13 is missing or that some other trigger event has occurred and notifies a VLSC 15. In step 53, the VLSC 15 causes an IS communications transmitter 17 and associated IS communications antenna 19 to broadcast an IS that is selectively addressed to the IS communications apparatus on the trigger event vehicle 13. A selective IS is broadcast, requesting that the IS communications apparatus on the trigger event vehicle 13 respond by transmitting the present location of the LDS antenna 33. In step 55, the IS communications receiver 21 on the vehicle 13 receives the IS and notifies the controller 25 that a vehicle location request was received. In step 57, the controller 25 interrogates the LDS signal receiver/processor 31 as to the present, or last known, location of the vehicle 13. In step 59, the LDS receiver/processor 31 obtains the present location information for the vehicle 13 from the LDS signals received and sends this vehicle present location information to the controller 25, or directly to the IS responder or transmitter means 27 on the vehicle. The LDS receiver/processor 31 may have received this information continuously in the recent past, or the LDS receiver/processor may have been "awakened" and caused to determine the vehicle present location information by the IS received in step 55.

The LDS receiver/processor 31 may fully process the LDS signals received and provide the vehicle present location in a selected coordinate system. Alternatively, the LDS receiver/processor may partly process the LDS signals received and provide partly processed vehicle present location information, with the remainder of the processing to determine the vehicle present location information being performed at the IS contact receiver 43.

In step 61, the controller 25 causes the IS responder/transmitter means 27 and associated IS antenna 29 to contact a selected IS contact number at an IS contact receiver 43, which be coincident with the VLSC 15 or may be separate from the VLSC. The IS responder/transmitter means 27 transmits the vehicle present location information in a short burst of data contained in an IS response signal, in step 63. The vehicle present location information can be updated continuously or intermittently, or the IS responder/transmitter means 27 may contact the IS contact receiver 43 only once, as desired. In step 65, the VLSC 15 or the IS contact receiver 43 determines the vehicle present location information (by further processing, if necessary), displays the vehicle present location on a map (step 67, optional), and notifies the vehicle owner/operator 13 and/or local law enforcement authorities of the vehicle's present location. The vehicle owner/operator and/or law enforcement authorities can then recover the vehicle. Optionally, the IS responder means 27 may examine the vehicle present location and determine which of a plurality of IS contact receivers should receive the IS response signal (e.g., based on which is closest) in step 60. When the IS response signal is received, preferably with acknowledgment, at the IS contact receiver 43, the IS responder means 43 may discontinue sending vehicle present location information or may send such information continuously or intermittently.

Figure 4:
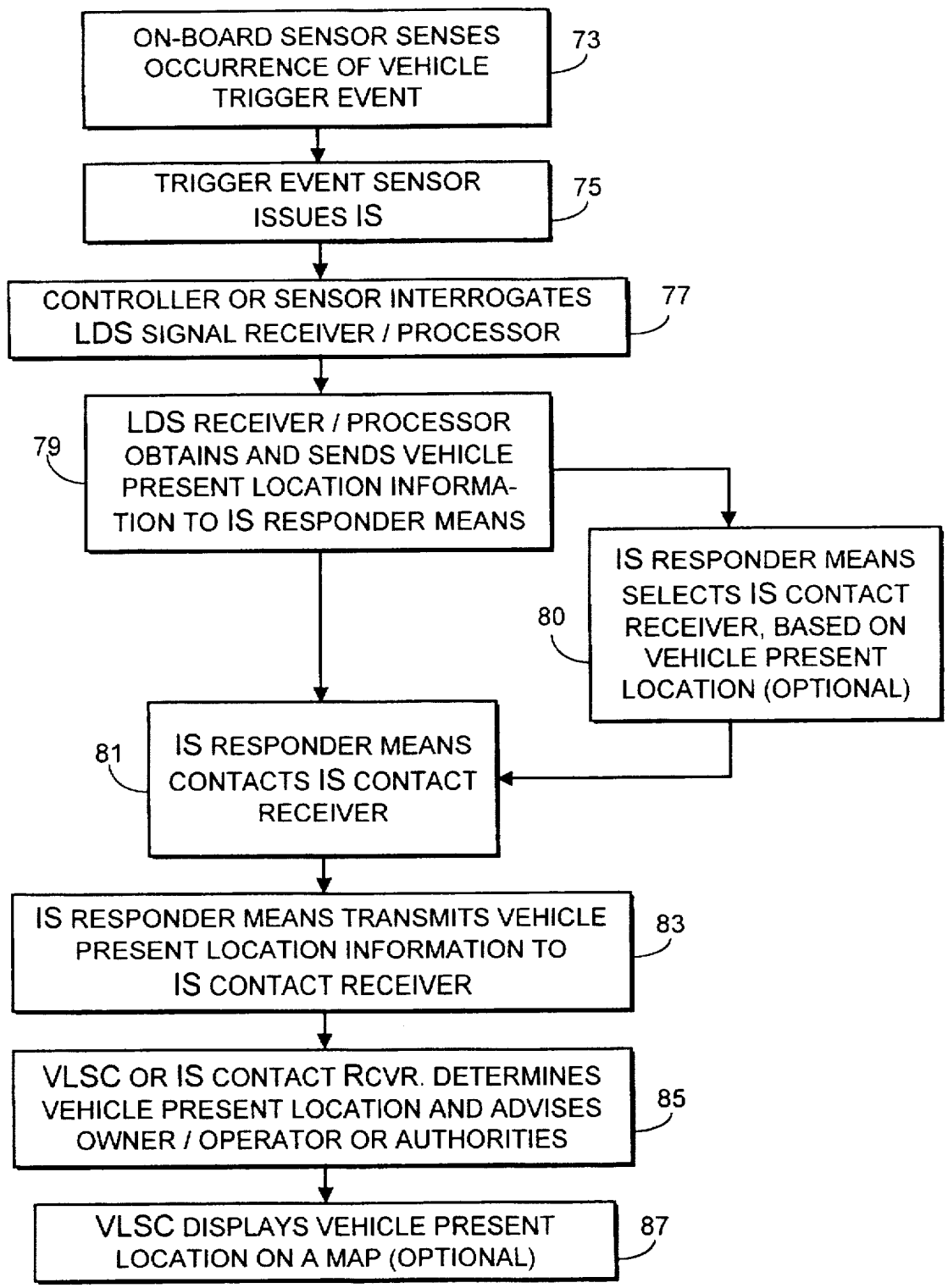

Alternatively, as illustrated in flow chart form in FIG. 4, one or more sensors positioned on the vehicle 13 may sense occurrence of a vehicle trigger event, initiate its own IS, and cause the IS responder/transmitter means 27 to contact a selected IS contact receiver 43 and to transmit the vehicle present location information. In this situation, the IS transmitter 17 and associated antenna 19, the IS communications receiver 21 and associated antenna 23 are not required and may be deleted from the communications apparatus on the vehicle 13. Optionally, the controller 25 and/or modem 26 may also be deleted from the vehicle communications apparatus. The vehicle communications apparatus notifies the IS contact receiver 43 that a trigger event has occurred, without requiring receipt of an IS from a VLSC or an IS transmitter 17.

In step 73, some action involving the vehicle 13, such as movement of the vehicle, is sensed by a trigger event sensor 36 that is attached to or adjacent to the vehicle 13. In step 75, the trigger event sensor 36 issues an IS.

In step 77, the controller 25 or the sensor 36 interrogates the LDS receiver/processor 31 for present location information on the vehicle. The steps 79, 80, 81, 83, 85 and 87 in FIG. 4 are the same as the respective steps 59, 60, 61, 63, 65 and 67 in FIG. 3. Optionally, the controller 25 can be eliminated, and the trigger event sensor 36 can directly cause the LDS receiver/processor 31 to obtain the vehicle present location information and to provide this information for the IS transmitter or responder means 27.

FIG. illustrates communications apparatus 91 to be carried on the vehicle according to a first embodiment of the invention. This apparatus includes: the IS communications receiver 21 and associated antenna 23 (to receive an IS from the VLSC 15), the controller 25, the modem 26 (optional), the IS responder/transmitter means 27 and associated antenna 29, the LDS receiver/processor and associated LDS antenna 33, and a power supply 34 that provides power for one or more of these communications components. Preferably, a separate back-up power supply, such as 34', provisionally provides power for operation of these communications components when power from the primary power source 34 is not available.

Figure 5:
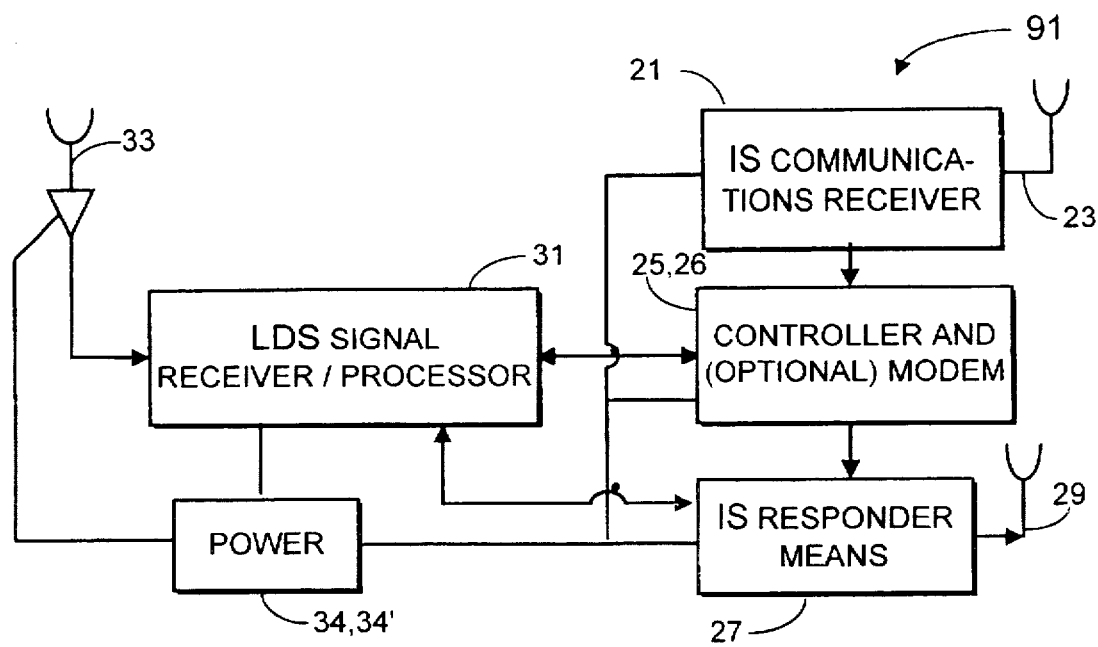
FIGS. 5 and 6 are schematic views of apparatus according to the two embodiments of the invention.
Figure 6:
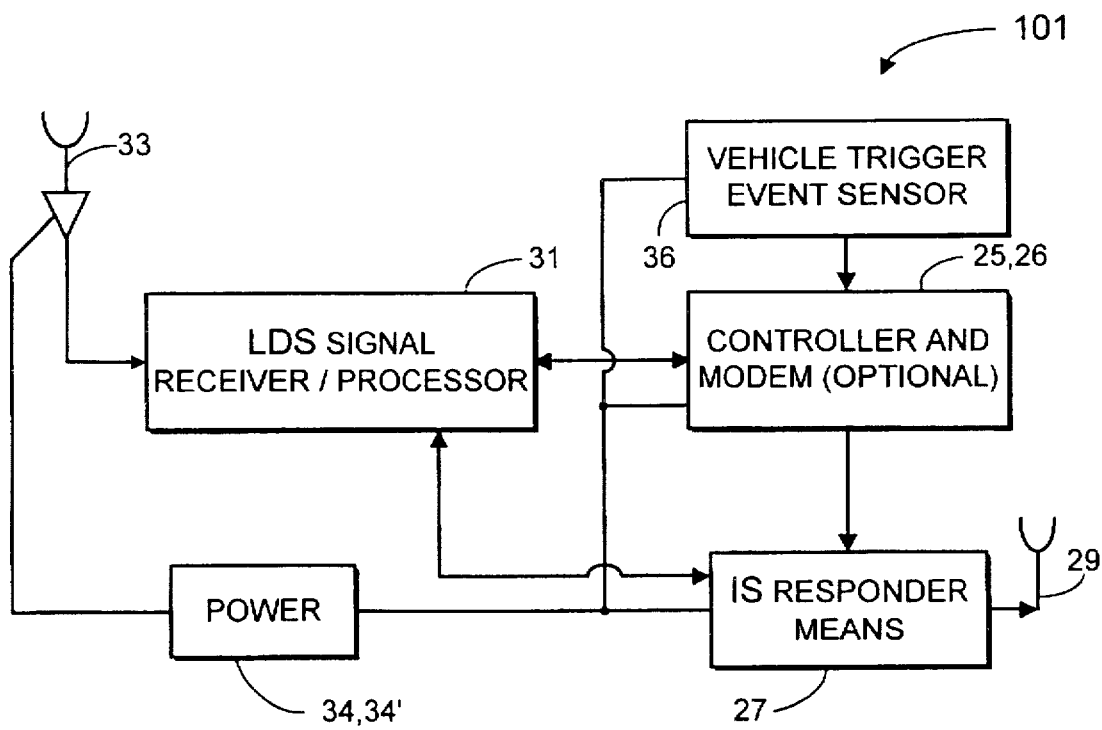

FIG. 6 illustrates electronic apparatus 101 to be carried on or provided adjacent to the vehicle according to the second embodiment of the invention. The IS communications receiver 21 and associated antenna 23 (and, optionally, the controller 25 and/or modem 26) shown in FIG. 5 are replaced by an trigger event sensor 36 that functions as discussed in connection with FIG. 4, with all other components being as in FIG. 5.

The IS communications transmitter 17 and associated antenna 19 and the on-board IS communications receiver 21 and associated antenna 23 may be (1) cellular telephone apparatus, (2) paging signal apparatus, (3) WAN/LAN communications apparatus or (4) Earth-satellite-Earth radiowave link apparatus, as discussed above. Independent of this choice, the on-board IS transmitter or responder means 27 and associated antenna 29 and the IS contact receiver 43 and associated antenna 41 may be (1) cellular telephone apparatus, (2) paging signal apparatus, (3) WAN/LAN communications apparatus or (4) Earth-satellite-Earth radiowave link apparatus, as discussed above.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System (GPS) and the Global Orbiting Navigational Satellite System (GLONASS).

The Global Positioning System (GPS) is part of a satellite-based navigation system developed by the U.S. Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude.

The orbits have radii of 26,560 kilometers and are approximately circular.

The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 of and f2=1200 of of a base frequency of =1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomemon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 fo =10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of fo=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2 =(1.246+7k/16) GHz, where k(=0, , 2, . . ., 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op cit. Other satellite-based systems that might be used for location determination include the Global Orbiting Navigational Satellite System (GLONASS), the Orbital Sciences ORBCOMM$^{SM}$ system and the Motorola Iridium system. Use of a satellite-based LDS is illustrated in FIG. 1.

Alternatively, the SATPS signals may be replaced by LDS signals produced by three or more ground-based LDS signal sources, such as Loran C, Omega, Decca, Tacan, JTIDS Relnav, PLRS, VOR/DME, an FM subcarrier system or an AM subcarrier system, positioned at fixed, known locations for location determination, as illustrated in FIG. 2. A ground-based LDS system may upon signals broadcast from a plurality of groundbased signal towers, spaced apart by distances of 10–300 km, that transmit distinguishable, time coded electromagnetic signals that are received and processed by an LDS signal antenna and LDS signal receiver/processor. A representative Loran system is discussed in *Loran-C User Handbook*, Department of Transportation, U.S. Coast Guard, Commandant Instruction M16562.3, May 1990, and by Magee et al in U.S. Pat. No. 3,665,086, which are incorporated by reference herein. If a time-coded message sequence is received from each of three Loran transmitters, the relative time delays between these three messages can be used to determine the location of the signal receiver/processor with an estimated inaccuracy of the order of one hundred meters. One disadvantage of use of a Loran or other ground-based location determination system, vis-a-vis an SATPS location determination system, is that a large number of tall structures, with transmitters mounted thereon, may be needed to cover a given area with a Loran system; whereas a relatively small number of SATPS satellites suffice for location determination using an SATPS configuration. Loran-C signals use carrier frequencies of the order of 100 kHz and have maximum reception distances of the order of hundreds of kilometers.

Other ground-based radiowave signal systems that are suitable for use as part of a ground-based LDS include Omega, Decca, Tacan, JTIDS Relnav (U.S. Air Force Joint Tactical Information Distribution System) and PLRS (U.S. Army Position Location and Reporting System) and are summarized by Logsdon, op cit. pp. 6–7 and 35–40, incorporated by reference herein. Other suitable ground-based LDSs include VOR/DME (distance measuring equipment).

The combined use of FM subcarrier signals, as discussed by Kelley et al in U.S. Pat. No. 5,173,710 (incorporated by reference herein), for location determination inside or behind a building or similar structure, plus SATPS or ground-based LDS signals, for location determination outside a building or similar structure, can also provide a satisfactory LDS in most urban and suburban communities.

A third method of providing a location fix for a vehicle is through "dead reckoning", using a plurality of gyroscopes whose angular orientations relative to an initial, fixed coordinate system are accumulated, read out and transmitted to the vehicle location service center, upon receipt of a command from a controller/modem carried by the vehicle. This approach to providing a location fix requires that the vehicle velocity v(t) and gyroscopically-determined angle cosines α(t), β(t) and χ(t) for vehicle orientation be monitored during all times the vehicle is in motion, in order to provide the cumulative location coordinate changes $$\Delta x(t) = v(t') \cos \alpha(t') dt', \qquad (1)$$

$$\Delta y(t) = v(t') \cos \beta(t') dt', \qquad (2)$$

$$\Delta z(t) = v(t') \cos \chi(t') dt', \qquad (3)$$

of the vehicle at any particular time t from a known initial location. Use of gyroscopes as a navigation instrument for determination of the present angle cosines of an object is described in U.S. Pat. No. 4,370,815, issued to Younkin. Use of a gyroscope for land vehicle navigation is disclosed by Romacker in U.S. Pat. No. 4,416,066. Use of a gyroscope and an induced magnetic field during rotation of a body to obtain an angle cosine and its time derivative is disclosed by Moore in U.S. Pat. No. 4,197,655. Use of a gyroscope and an acoustic surface wave sensor to obtain an angle cosine and its time derivative is disclosed in U.S. Pat. No. 4,384,409, issued to Lao. These patents, which are incorporated by reference herein, teach methods for use of one or more gyroscopes for determining an angle cosine and its time derivative and for inertial navigation.

A fourth method of providing a location fix for a vehicle is through dead reckoning, using a plurality of local magnetic field direction sensors whose angular orientations relative to an initial, fixed coordinate system are accumulated, read out and transmitted to the vehicle location service center, upon receipt of a command from a controller/ modem carried by the vehicle.

This approach to providing a location fix requires that the vehicle velocity v(t) and the angle cosines $\alpha(t)$, $\beta(t)$ and $\chi(t)$ describing vehicle orientation, determined by the local magnetic field direction, also be monitored during all times the vehicle is in motion, in order to provide the cumulative location coordinate changes of the vehicle at any particular time t from a known initial location, as in Eqs. (1), (2) and (3). Use of local magnetic field direction sensors to help determine the present direction of a moving object is described by Takai in U.S. Pat. No. 4,743,913. The Earth's magnetic field varies in intensity from about −0.7 Gauss near the South Pole to approximately 0 Gauss at the equator to around +0.6 Gauss at 60° North latitude, which passes near the magnetic north pole in the Hudson Bay region of North America, according to D. S. Parasnis, *Magnetism*, Harper & Brothers, New York, 1961, pp. 91–121. The direction of the local magnetic field varies in an irregular manner with the latitude and longitude coordinates on the Earth's surface. Thus, if a map of the amplitude and direction of the local magnetic field is prepared and stored in a computer memory, which can be carried on the vehicle or kept at a base station of the missing vehicle location system, use of the map plus the output signals from the local magnetic field sensors will allow the present location of the vehicle, whether in motion or not, to be determined with acceptable accuracy.

We claim:

1. Apparatus for determining the present location of a vehicle, the apparatus comprising:

an activatable location determination (LD) system, carried on or in a vehicle, to receive and process LD signals from LD signal sources spaced apart from the vehicle and to determine present location of the LD system;

a vehicle interrogation signal (IS) receiver that receives a vehicle interrogation signal and, in response thereto, issues a location interrogation signal that commands the LD system to determine and issue, as an output signal, information on the present location of the LD system;

an IS responder, connected to the LD system, that receives the LD system output signal and transmits this signal to a selected IS contact receiver that is spaced apart from the vehicle; and an activatable power supply that delivers electrical power to the LD system, to the IS receiver and to the IS responder, where power from power supply is delivered to the LD system for a short time interval at one or more selected times to allow estimation of the present location of the LD system;

wherein said IS responder selects said IS contact receiver, from a plurality of IS contact receivers, to receive said LD system output signal, based upon said LD system present location relative to the locations of the IS contact receivers; and wherein at least one of said IS receiver and said IS responder is part of an LAN station in a WAN/LAN communications network, and the LAN station comprises an LAN packet radio that communicates using a frequency range with, and is part of, a WAN network that serves a geographic region in which said vehicle is likely to be located.

2. Apparatus for determining the present location of a vehicle, the apparatus comprising:

an activatable location determination (LD) system, carried on or in a vehicle, to receive and process LD signals from LD signal sources spaced apart from the vehicle and to determine present location of the LD system;

a vehicle interrogation signal (IS) receiver that receives a vehicle interrogation signal and, in response thereto, issues a location interrogation signal that commands the LD system to determine and issue, as an output signal, information on the present location of the LD system;

an IS responder, connected to the LD system, that receives the LD system output signal and transmits this signal to a selected IS contact receiver that is spaced apart from the vehicle; and an activatable power supply that delivers electrical power to the LD system, to the IS receiver and to the IS responder, where power from power supply is delivered to the LD system for a short time interval at one or more selected times to allow estimation of the present location of the LD system;

wherein said IS responder selects said IS contact receiver, from a plurality of IS contact receivers, to receive said LD system output signal, based upon said LD system present location relative to the locations of the IS contact receivers; and wherein at least one of said IS receiver and said IS responder is part of an LAN station in a WAN/LAN communications network, and the LAN station comprises a LAN cellular radio that communicates using a frequency range with, and is part of, a WAN network that services a geographic region in which said vehicle is likely to be located.

3. Apparatus for determining the present location of a vehicle, the apparatus comprising:

an activatable location determination (LD) system, carried on or in a vehicle, to receive and process LD signals from LD signal sources spaced apart from the vehicle and to determine a present location of the LD system;

a vehicle interrogation signal (IS) receiver that receives a vehicle interrogation signal and, in response thereto, issues a location interrogation signal that commands the LD system to determine and issue, as an output signal, information on the present location of the LD system;

an IS responder, connected to the LD system, that receives the LD system output signal and transmits this signal to a selected IS contact receiver that is spaced apart from the vehicle; and an activatable power supply that delivers electrical power to the IS receiver and to at least one of the LD system and the IS responder, where power from the power supply is not delivered to the at least one of the LD system and the IS responder until receipt by the IS receiver of the vehicle interrogation signal;

wherein said IS responder selects said IS contact receiver, from a plurality of Is contact receivers, to receive said LD system output signal, based upon said LD system resent location relative to the locations of the IS contact receivers; and wherein at least one of said IS receiver and said IS responder is part of an LAN station in a WAN/LAN communications network, and the LAN station comprises an LAN packet radio that communicates using a frequency range with, and is part of, a WAN network that serves a geographic region in which said vehicle is likely to be located.

4. Apparatus for determining the present location of a vehicle, the apparatus comprising:

an activatable location determination (LD) system, carried on or in a vehicle, to receive and process LD signals from LD signal sources spaced apart from the vehicle and to determine a present location of the LD system;

a vehicle interrogation signal (IS) receiver that receives a vehicle interrogation signal and, in response thereto, issues a location interrogation signal that commands the LD system to determine and issue, as an outside signal, information on the present location of the LD system;

an IS responder, connected to the LD system, that receives the LD system output signal and transmits this signal to a selected IS contact receiver that is spaced apart from the vehicle; and an activatable power supply that delivers electrical power to the IS receiver and to at least one of the LD system and the IS responder, where power from the power supply is not delivered to the at least one of the LD system and the IS responder until receipt by the IS receiver of the vehicle interrogation signal;

wherein said IS responder selects said IS contact receiver, from a plurality of IS contact receivers, to receive said LD system output signal, based upon said LD system present location relative to the locations of the IS contact receivers; and;

wherein at least one of said IS receiver and said IS responder is part of an LAN station in a WAN/LAN communications network, and the LAN station comprises a LAN cellular radio that communicates using a frequency range with, and is part of, a WAN network that serves a geographic region in which said vehicle is likely to be located.

5. Apparatus for determining the present location of a vehicle, the apparatus comprising:

an activatable location determination (LD) system, carried on or in a vehicle, to receive and process LD signals and to determine a present location of the LD system;

an event sensor, carried on or in the vehicle, that determines when a selected trigger event involving the vehicle has occurred and, when that event occurs, issues a location interrogation signal (IS) that commands the LD system to determine and issue, as an output signal, information on the present location of the LD system;

an event responder, connected to the LD system, for transmitting the LD system output signal to a selected event contact receiver that is spaced apart from the vehicle; and an activatable power supply that delivers electrical power to at least one of the LD system, the event sensor and the event responder, where power from the power supply is delivered to the LD system for a shot time interval at one or more selected times to allow estimation of the present location of the LD system;

wherein said IS responder selects said IS contact receiver, from the plurality of IS contact receivers, to receive said LD system output signal, based upon said LD system present location relative to the locations of the IS contact receivers; and wherein IS responder is part of an LAN station in a WAN/LAN communications network, and the LAN station comprises an LAN packet radio that communicates using a frequency range with, and is part of, a WAN network that serves a geographic region in which said vehicle is likely to be located.

6. Apparatus for determining the present location of a vehicle, the apparatus comprising:

an activatable location determination (LD) system, carried on or in a vehicle, to receive and process LD signals from LD signal and to determine a present location of the LD system;

an event sensor, carried on or in the vehicle, that determines when a selected trigger event involving the vehicle has occurred and, when that event occurs, issues a location interrogation signal (IS) that commands the LD system to determine and issue, as an output signal, information on the present location of the LD system;

an event responder, connected to the LD system, for transmitting the LD system output signal to a selected event contact receiver that is spaced a part from the vehicle; and an activatable power supply that delivers electrical power to at least one of the LD system, the event sensor and the event responder, where power from the power supply is delivered to the LD system for a shot time interval at one or more selected times to allow estimation of the present location of the LD system;

wherein said IS responder selects said IS contact receiver, from the plurality of IS contact receivers, to receive said LD system output signal, based upon said LD system present location relative to the locations of the IS contact receivers; and wherein IS responder is part of an LAN station in a WAN/LAN communications network, and the LAN station comprises a LAN cellular radio that communicates using a frequency range with, and is part of, a WAN network that serves a geographic region in which said vehicle is likely to be located.

7. Apparatus for determining the present location of a vehicle, the apparatus comprising:

an activatable location determination (LD) system, carried on or in a vehicle, to receive and process LD signals from an LD signal source spaced apart from the vehicle and to determine a present location of the LD system;

an event sensor, carried on or in the vehicle, that determines when a selected trigger event involving the vehicle has occurred and, when that event occurs, issues a location interrogation signal (IS) that commands the LD system to determine and issue, as an output signal, information on the present location of the LD system;

an event responder, connected to the LD system, for receiving the LD system output signal and for transmitting this signal to a selected event contact receiver that is spaced apart from the vehicle; and an activatable power supply that delivers electrical power to at least one of the LD system, the event sensor and the event responder, where power from the power supply is not delivered to the at least one of the LD system and the event responder until receipt by the LD system of the IS;

wherein said event responder selects said IS contact receiver from the plurality of IS contact receivers, to receive said LD system output signal, based upon said LD system present location relative to the locations of the IS contact receivers; and wherein said event responder is part of an LAN station in a WAN/LAN communications network, and the LAN station comprises an LAN packet radio that communicates using a frequency range with, and is part of, a WAN network that serves a geographic region in which said vehicle is likely to be located.

8. Apparatus for determining the present location of a vehicle, the apparatus comprising:

an activatable location determination (LD) system, carried on or in a vehicle, to receive and process LD signals from an LD signal source spaced apart from the vehicle and to determine a present location of the LD system;

an event sensor, carried on or in the vehicle, that determines when a selected trigger event involving the vehicle has occurred and, when that event occurs, issues a location interrogation signal (IS) that commands the LD system to determine and issue, as an output signal, information on the present location of the LD system;

an event responder, connected to the LD system, for receiving the LD system output signal and for transmitting this signal to a selected event contact receiver that is spaced apart from the vehicle; and an activatable power supply that delivers electrical power to at least one of the LD system, the event sensor and the event responder, where power from the power supply not delivered to the at least one of the LD system and the event responder until receipt by the LD system of the IS;

wherein said event responder selects said IS contact receiver from the plurality of IS contact receivers, to receive said LD system output signal, based upon said LD system present location relative to the locations of the IS contact receivers; and wherein said event responder is part of an LAN station in a WAN/LAN communications network, and the LAN station comprises a LAN cellular radio that communicates using a frequency range with, and is part of, a WAN network that serves a geographic region in which said vehicle is likely to be located.

* * * * *